United States Patent [19]
Spotnitz

[11] Patent Number: 6,007,940
[45] Date of Patent: Dec. 28, 1999

[54] PORTABLE POWER TOOL HAVING LOW RATE, RECHARGEABLE BATTERIES

[75] Inventor: Robert M. Spotnitz, Charlotte, N.C.

[73] Assignee: Celgard LLC, Charlotte, N.C.

[21] Appl. No.: 08/979,017

[22] Filed: Nov. 26, 1997

[51] Int. Cl.⁶ .................................................. H01M 2/10
[52] U.S. Cl. ......................... 429/99; 429/100; 429/218.2
[58] Field of Search ................................ 429/218.2, 99, 429/100; 439/500

[56] References Cited

U.S. PATENT DOCUMENTS

| | | |
|---|---|---|
| 3,919,615 | 11/1975 | Niecke ........................................ 320/2 |
| 5,076,805 | 12/1991 | Welch . |
| 5,354,215 | 10/1994 | Viralola . |
| 5,680,026 | 10/1997 | Lueschen .................................... 320/2 |

*Primary Examiner*—John S. Maples
*Attorney, Agent, or Firm*—Robert H. Hammer, III

[57] ABSTRACT

The present invention is directed to a portable power tool having an electric power tool, a low rate battery pack and a cable interconnecting the pack to the tool. The pack is remote from the tool.

5 Claims, 3 Drawing Sheets

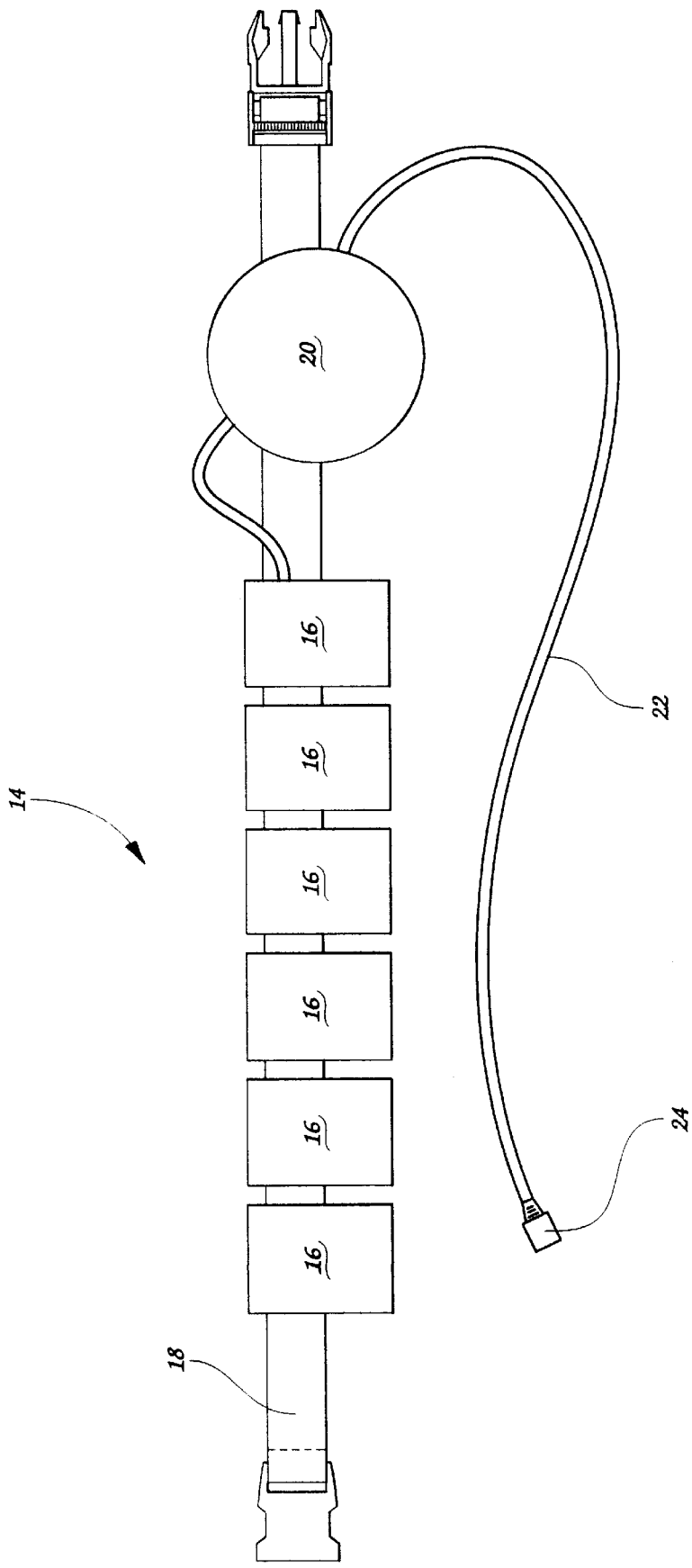

PORTABLE POWER TOOL HAVING LOW RATE, RECHARGEABLE BATTERIES

FIELD OF THE INVENTION

This invention is directed to portable power tools having low rate, rechargeable batteries.

BACKGROUND OF THE INVENTION

Portable power tools having high rate, rechargeable batteries are commercially available. A high rate and rechargeable battery is a nickel cadmium (NiCd) battery. A high rate battery is one that is capable of discharging its entire energy capacity in a relatively short period of time. Tools using high rate batteries are, however, limited because the charge in the high rate battery can be dissipated quickly as a result of use. This requires that the battery be frequently recharged or that additional battery packs be provided if prolonged use is desired. Others have proposed that the useable life of the nickel cadmium battery pack can be extended by mounting additional batteries on articles of clothing. See U.S. Pat. Nos. 3,919,615 and 5,680,026. This solution, however, is obtained at the expense of increased weight arising from additional batteries.

Low rate batteries, for example, lithium ion (Li ion) or nickel metal hydride (NiHM) batteries, are commercially available. But, their use is confined to portable electronic devices, such as telephones, computers and pagers, and their use in power tools has not been suggested because these batteries are unable to provide the current density required to operate a tool.

Accordingly, there is a need to provide a power tool that can be operated for greater lengths of time without dramatic increases in the weight of the tool.

SUMMARY OF THE INVENTION

The present invention is directed to a portable power tool having an electric power tool, a low rate battery pack and a cable interconnecting the pack to the tool. The pack is remote from the tool.

DESCRIPTION OF THE DRAWINGS

For the purpose of illustrating the invention, there is shown in the drawings a form which is presenting preferred; it being understood, however, that this invention is not limited to the precise arrangements and instrumentalities shown.

FIG. 3 is an illustration of the battery pack portion of the present invention as it may be embodied on a belt.

DETAILED DESCRIPTION OF THE INVENTION

Figure 1:
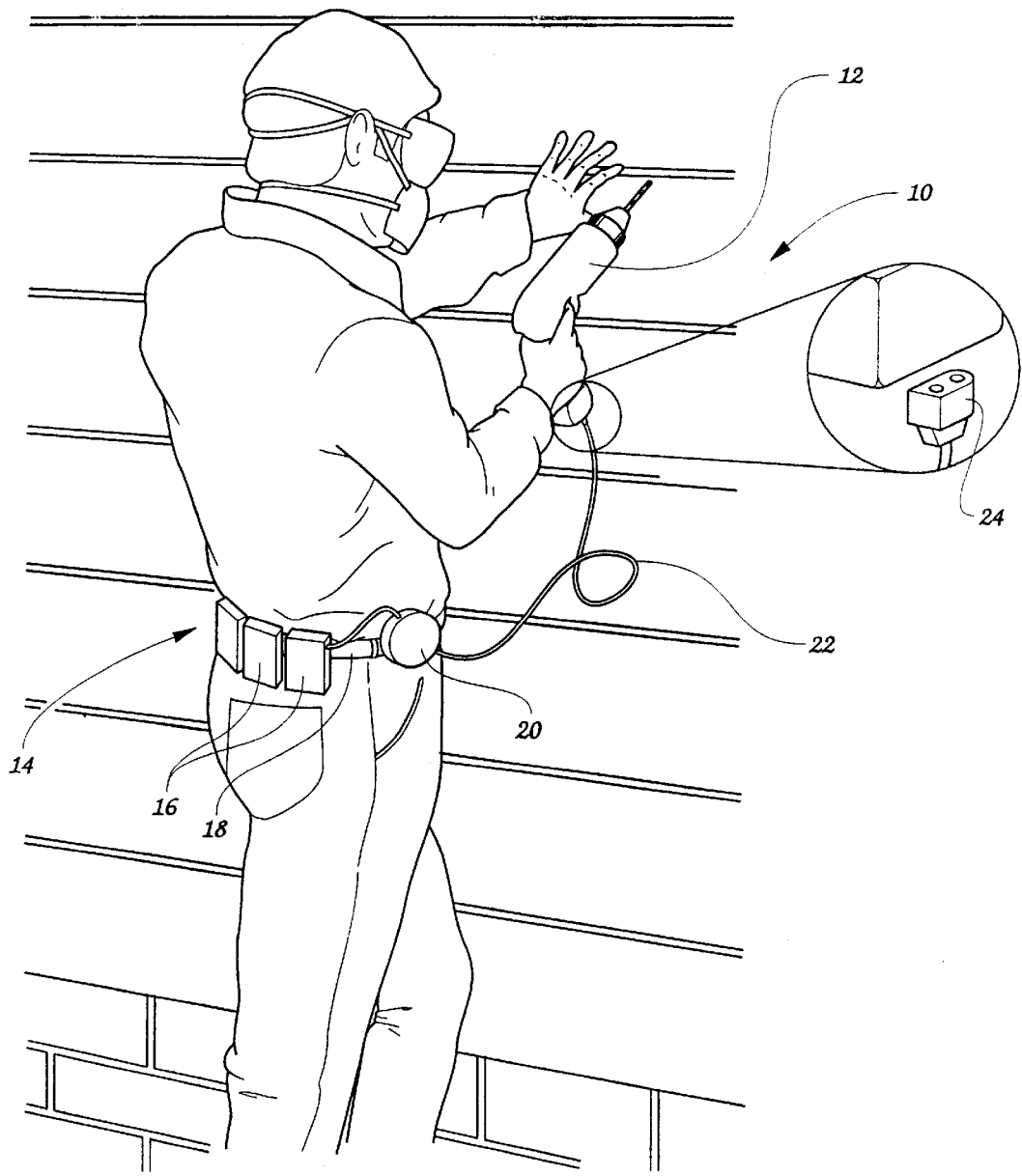
FIG. 1 is an illustration of an embodiment of the present invention in use by a worker.
Figure 2:
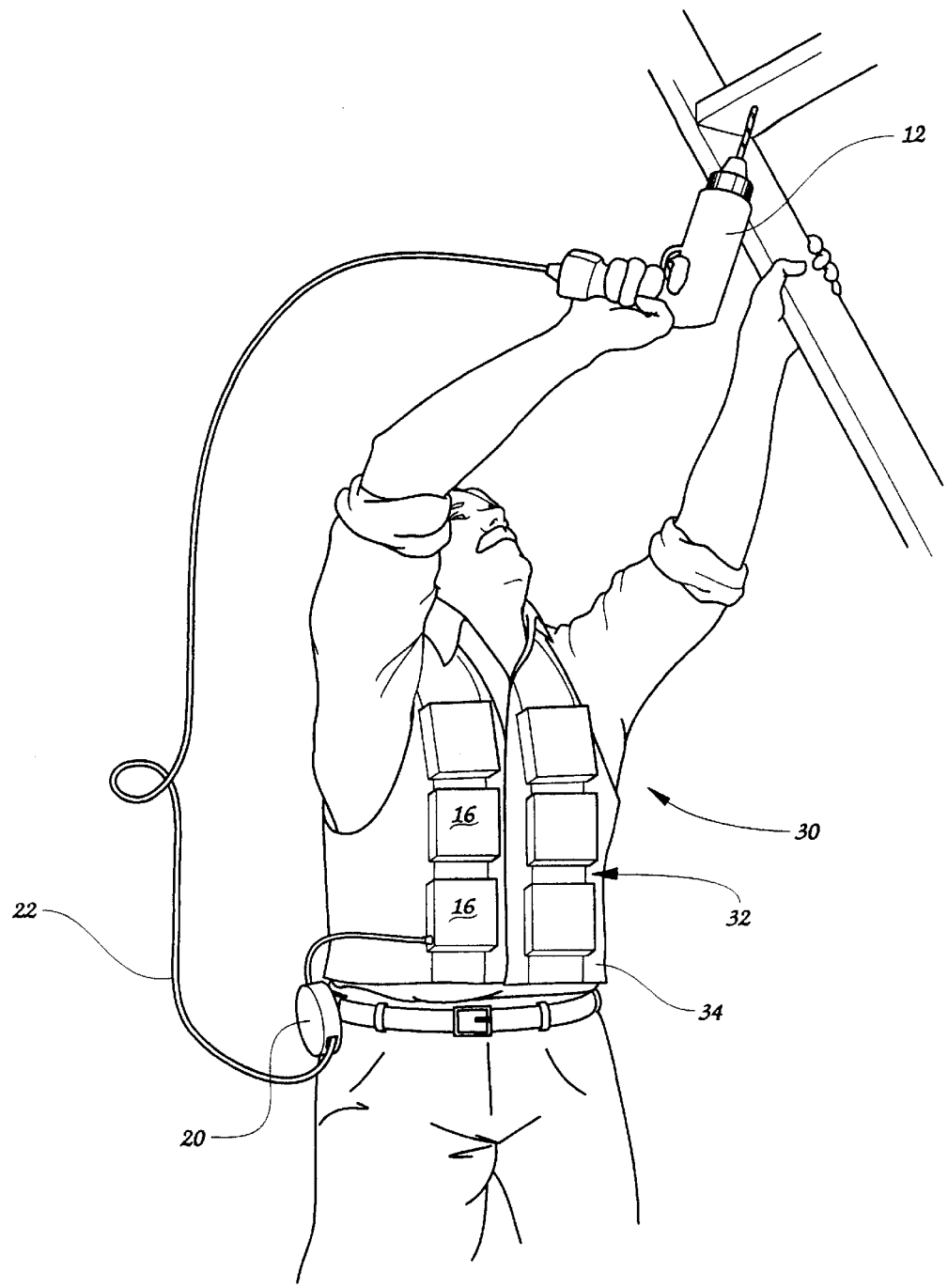
FIG. 2 is an illustration of another embodiment of the present invention in use by a worker.

Referring to the drawings, wherein like numerals indicate like elements, there is shown in FIG. 1 a portable power tool 10 and in FIG. 2 a portable power tool 30. Portable power tools 10 and 30 comprise an electric tool 12, a battery pack 14/32 and a cable 22.

Electric tool 12 is illustrated as a drill, but is not so limited. Other electric tools include, but are not limited to, saws, grinding tools, polishing tools, lawn care tools, garden tools, video equipment, audio equipment, testing equipment, military equipment, and the like.

Battery pack 14 in FIG. 1 is illustrated on a belt 18. Battery pack 14 in FIG. 2 is illustrated on a vest 34. On both articles of clothing, low rate batteries 16 are mounted on the article of clothing. These low rate batteries, discussed below in greater detail, are electrically connected in parallel. The belt 18 or vest 34 are a conventional design. FIG. 3 illustrates the battery pack in belt form.

Cable 22 electrically connects battery pack 14/32 to power tool 12. The exploded portion of FIG. 1 illustrates a detachable connector 24, but any suitable connector may be used. Preferably, cable 22 may be mounted on reel 20. Reel 20 is a retractable device, as is well known, and is used to contain cable 22 when it is not in use. Preferably, cable 22 may be cut-resistant (e.g., metal clad), as is well known.

Low rate batteries refers to a battery that delivers its full energy capacity over a long period of time (e.g., >1 hour), but cannot deliver a significant fraction of its capacity over a short period (e.g., 5 minutes). In contrast, a high rate battery refers to a battery that delivers its full energy capacity over a short period. To illustrate the foregoing, a high rate battery (e.g., a NiCd cell) will be compared to two low rate batteries (e.g., Li ion and NiMH).

TABLE 1

|  | NiCd | Li ion | NiMH |
| --- | --- | --- | --- |
| Nominal voltage (V) | 1.2 | 3.6 | 1.2 |
| Energy density Watt hour/kg (Wh/kg) | 35 | 110 | 50 |
| Watt hour/Liter | 80 | 260 | 175 |

(from Linden, P., editor, Handbook of Batteries, 2ed, McGraw-Hill, New York 1995).

First, consider a 20 watt electric tool and batteries (NiCd, Li ion and NiMH) of equivalent volume. A 1.32 watt hour (Whr) NiCd battery would operate the tool for about 3 minutes and utilize about 80% of its capacity; a 4.29 Whr Li ion battery would operate for about 1.3 minutes and utilize about 10% of its capacity; and a 2.89 Whr NiMH battery would operate for about 1.7 minutes and utilize about 20% of its capacity. Accordingly, low rate batteries cannot be effectively used on portable power tools if they are mounted on the tool.

Second, consider the same 20 watt tool, but larger volume low rate batteries. If the foregoing Li ion battery is tripled in volume, then it will deliver 12.9 Whr and operate the tool for 38.6 minutes. In contrast, making the NiCd three times larger would only increase the run time to 11.9 minutes. To make the NiCd cell equivalent in run time to the Li ion all, the NiCd cell would have to be ten times larger in volume. On the equivalent run time basis (i.e., 38.6 minutes), the NiCd cell would weight about three times the Li ion cell (i.e., NiCd 0.37 kg vs Li ion–0.12 kg).

The present invention may be embodied in other specific forms without disparting from the spirit or central attributes thereof and, accordingly, reference should be made to the appended claims, rather than to the foregoing specifications, as indicating the scope of the invention.

We claim:

1. A portable power tool comprising:
   an electric power tool;
   a low rate battery pack, said battery pack being remote from said tool; and
   a cable interconnecting said pack to said tool.

2. The tool of claim 1 wherein said low rate battery pack is selected from the group consisting of lithium ion batteries and nickel metal hydride batteries.

3. The tool of claim 1 wherein said cable being detachably connectable to said tool.

4. The tool of claim 1 wherein said cable being retractably mounted on said pack.

5. The tool of claim 1 further comprising said cable having means for resisting cutting.

* * * * *